United States Patent
Goetzinger et al.

(10) Patent No.: US 7,103,051 B2
(45) Date of Patent: Sep. 5, 2006

(54) QOS SCHEDULER AND METHOD FOR IMPLEMENTING QUALITY OF SERVICE WITH AGING TIME STAMPS

(75) Inventors: William John Goetzinger, Rochester, MN (US); Glen Howard Handlogten, Rochester, MN (US); James Francis Mikos, Rochester, MN (US); David Alan Norgaard, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 941 days.

(21) Appl. No.: 10/002,416

(22) Filed: Nov. 1, 2001

(65) Prior Publication Data

US 2003/0081611 A1 May 1, 2003

(51) Int. Cl.
*H04L 12/56* (2006.01)

(52) U.S. Cl. .............................. 370/395.4; 370/395.41; 370/395.42; 370/395.43; 370/412

(58) Field of Classification Search ........ 370/229–235, 370/252, 253, 412–418, 395.1, 395.41–395.43, 370/461, 462
See application file for complete search history.

(56) References Cited

U.S. PATENT DOCUMENTS

| 4,621,359 A | 11/1986 | McMillen |
| 5,249,184 A | 9/1993 | Woest et al. |
| 5,490,141 A | 2/1996 | Lai et al. |

(Continued)

FOREIGN PATENT DOCUMENTS

EP    0859492 A2    8/1998

(Continued)

OTHER PUBLICATIONS

U.S. Appl. No. 10/102,343, filed Mar. 20, 2002, "Network Processor Having Fast Flow Queue Disable Process".

(Continued)

*Primary Examiner*—Hassan Kizou
*Assistant Examiner*—Habte Mered
(74) *Attorney, Agent, or Firm*—Joan Pennington

(57) ABSTRACT

A scheduler, scheduling method, and computer program product are provided for implementing Quality-of-Service (QoS) scheduling of a plurality of flows with aging time stamps. Subsets of time stamp data stored in a time stamp aging memory array are sequentially accessed. Each time stamp data subset contains time stamp data for a subplurality of flows. Guaranteed aging processing steps are performed for each flow utilizing the time stamp data subsets to identify and mark invalid calendar next time values. When a new frame arrival for an empty flow is identified, flow queue control block (FQCB) time stamp data and the flow time stamp data in the time stamp aging memory array are accessed. Based on the calendar to which the new frame is directed or the target calendar for the new frame, the target calendar next time valid bit of the time stamp aging memory array data is checked. When the target calendar next time valid bit is on, a target calendar next time value from the flow queue control block (FQCB) time stamp data is compared with a current time. When the target calendar next time is less than the current time, the target calendar next time valid bit is turned off to mark the target calendar next time as invalid. The guaranteed aging processing steps for each flow in the time stamp data subset includes checking a selection indicator of the time stamp aging memory array data for the flow to identify a calendar. Responsive to the selection indicator value, a calendar valid bit is checked. When the calendar valid bit is on, a calendar next time is compared with a current time. When the calendar next time is less than the current time, the calendar valid bit is turned off to mark the calendar next time as invalid. Invalid time stamp values are identified for all scheduler calendars.

20 Claims, 8 Drawing Sheets

U.S. PATENT DOCUMENTS

| | | | |
|---|---|---|---|
| 5,548,590 A | 8/1996 | Grant et al. | |
| 5,629,928 A | 5/1997 | Calvignac et al. | |
| 5,650,993 A | 7/1997 | Lakshman et al. | |
| 5,742,772 A | 4/1998 | Sreenan | |
| 5,831,971 A | 11/1998 | Bonomi et al. | |
| 5,835,494 A | 11/1998 | Hughes et al. | |
| 5,844,890 A | 12/1998 | Delp et al. | |
| 5,850,399 A | 12/1998 | Ganmukhi et al. | |
| 5,905,730 A | 5/1999 | Yang et al. | |
| 5,926,459 A | 7/1999 | Lyles et al. | |
| 5,926,481 A | 7/1999 | Wang et al. | |
| 5,946,297 A | 8/1999 | Calvignac et al. | |
| 5,999,963 A | 12/1999 | Bruno et al. | |
| 6,014,367 A | 1/2000 | Joffe | |
| 6,018,527 A | 1/2000 | Yin et al. | |
| 6,028,842 A | 2/2000 | Chapman et al. | |
| 6,028,843 A | 2/2000 | Delp et al. | |
| 6,031,822 A | 2/2000 | Wallmeier | |
| 6,038,217 A | 3/2000 | Lyles | |
| 6,041,059 A | 3/2000 | Joffe et al. | |
| 6,052,751 A | 4/2000 | Runaldue et al. | |
| 6,064,650 A | 5/2000 | Kappler et al. | |
| 6,064,677 A | 5/2000 | Kappler et al. | |
| 6,067,301 A | 5/2000 | Aatresh | |
| 6,072,772 A | 6/2000 | Charny et al. | |
| 6,072,800 A | 6/2000 | Lee | |
| 6,078,953 A | 6/2000 | Vaid et al. | |
| 6,081,507 A * | 6/2000 | Chao et al. | 370/235 |
| 6,092,115 A | 7/2000 | Choudhury et al. | |
| 6,094,435 A | 7/2000 | Hoffman et al. | |
| 6,101,193 A | 8/2000 | Ohba | |
| 6,104,700 A | 8/2000 | Haddock et al. | |
| 6,108,307 A | 8/2000 | McConnell et al. | |
| 6,122,673 A | 9/2000 | Basak et al. | |
| 6,144,669 A | 11/2000 | Williams et al. | |
| 6,157,614 A | 12/2000 | Pasternak et al. | |
| 6,157,649 A | 12/2000 | Peirce et al. | |
| 6,157,654 A | 12/2000 | Davis | |
| 6,160,812 A | 12/2000 | Bauman et al. | |
| 6,169,740 B1 | 1/2001 | Morris et al. | |
| 6,188,698 B1 | 2/2001 | Galand et al. | |
| 6,226,267 B1 | 5/2001 | Spinney et al. | |
| 6,229,812 B1 | 5/2001 | Parruck et al. | |
| 6,229,813 B1 | 5/2001 | Buchko et al. | |
| 6,236,647 B1 | 5/2001 | Amalfitano | |
| 6,246,692 B1 | 6/2001 | Dai et al. | |
| 6,259,699 B1 | 7/2001 | Opalka et al. | |
| 6,266,702 B1 | 7/2001 | Darnell et al. | |
| 6,356,546 B1 | 3/2002 | Beshai | |
| 6,389,019 B1 | 5/2002 | Fan et al. | |
| 6,389,031 B1 | 5/2002 | Chao et al. | |
| 6,404,768 B1 | 6/2002 | Basak et al. | |
| 6,481,251 B1 | 11/2002 | Meier et al. | |
| 6,563,829 B1 | 5/2003 | Lyles et al. | |
| 6,608,625 B1 | 8/2003 | Chin et al. | |
| 6,611,522 B1 | 8/2003 | Zheng et al. | |
| 6,721,325 B1 * | 4/2004 | Duckering et al. | 370/395.4 |
| 6,810,012 B1 | 10/2004 | Yin et al. | |
| 6,810,043 B1 | 10/2004 | Naven et al. | |
| 6,810,426 B1 | 10/2004 | Mysore et al. | |
| 6,813,274 B1 | 11/2004 | Suzuki et al. | |
| 6,832,261 B1 | 12/2004 | Westbrook et al. | |
| 6,850,490 B1 | 2/2005 | Woo et al. | |
| 6,885,664 B1 | 4/2005 | Ofek et al. | |
| 6,891,835 B1 | 5/2005 | Kalkunte et al. | |
| 7,020,137 B1 | 3/2006 | Kadambi et al. | |
| 2001/0012294 A1 | 8/2001 | Kadambi et al. | |
| 2002/0003795 A1 | 1/2002 | Oskouy et al. | |
| 2002/0023168 A1 | 2/2002 | Bass et al. | |
| 2002/0136230 A1 | 9/2002 | Dell et al. | |
| 2002/0163922 A1 | 11/2002 | Dooley et al. | |
| 2002/0181455 A1 | 12/2002 | Norman et al. | |
| 2003/0050954 A1 * | 3/2003 | Tayyar et al. | 709/102 |

FOREIGN PATENT DOCUMENTS

| | | |
|---|---|---|
| EP | 0957602 A2 | 11/1999 |
| EP | 0989770 A1 | 3/2000 |
| EP | 1049352 A2 | 11/2000 |
| EP | 1061763 A2 | 12/2000 |
| JP | 04-094240 | 3/1992 |
| JP | 2000183886 A | 6/2000 |
| JP | 2000295247 A | 10/2000 |
| JP | 2001007822 A | 12/2000 |
| WO | WO99/35792 A1 | 7/1999 |
| WO | WO99/53647 A2 | 10/1999 |
| WO | WO99/53648 A2 | 10/1999 |
| WO | WO01/20876 A1 | 3/2001 |

OTHER PUBLICATIONS

U.S. Appl. No. 10/102,166, filed Mar. 20, 2002, "Method and Apparatus for Improving the Fairness of New Attaches to a Weighted Fair Queue in a Quality of Service (QoS) Scheduler".

Abstract of publication entitled "Design of packet-fair queuing scheduler using a RAM-based searching engine", by HJ Chao et al, IEEE Journal on Selected Areas in Communications, vol. 17, No. 6, pp. 1105-1126, Jun. 1999.

Lyons et al., "Estimating Clock Speeds for the ATMSwitch Architecture", Proc. Networks '99 (The Third New Zealand ATM and Broadband Workshop), 21-22, Jan. 1999, pp. 39-53.

U.S. Appl. No. 10/004,373, filed Nov. 1, 2001, by William John Goetzinger, Glen Howard Handlogten, James Francis Mikos, and David Alan Norgaard entitled "QoS Scheduler and Method for Implementing Peak Service Distance Using Next Peak Service Time Violated Indication".

U.S. Appl. No. 10/004,440, filed Nov. 1, 2001, by William John Goetzinger, Glen Howard Handlogten, James Francis Mikos, and David Alan Norgaard entitled"QoS Scheduler and Method for Implementing Quality of Service With Cached Status Array".

U.S. Appl. No. 10/004,217, filed Nov. 1, 2001, by William John Goetzinger, Glen Howard Handlogten, James Francis Mikos, and David Alan Norgaard entitled "QoS Scheduler and Method for Implementing Quality of Service Anticipating the End of a Chain of Flows".

U.S. Appl. No. 10/016,518, filed Nov. 1, 2001, by William John Goetzinger, Glen Howard Handlogten, James Francis Mikos, and David Alan Norgaard entitled "Weighted Fair Queue Having Extended Effective Range".

U.S. Appl. No. 10/015,994, filed Nov. 1, 2001, by William John Goetzinger, Glen Howard Handlogten, James Francis Mikos, and David Alan Norgaard entitled "Weighted Fair Queue Serving Plural Output Ports".

U.S. Appl. No. 10/015,760, filed Nov. 1, 2001, by William John Goetzinger, Glen Howard Handlogten, James Francis Mikos, and David Alan Norgaard entitled "Weighted Fair Queue Having Adjustable Scaling Factor".

U.S. Appl. No. 10/002,085, filed Nov. 1, 2001, by William John Goetzinger, Glen Howard Handlogten, James Francis Mikos, and David Alan Norgaard entitled "Empty Indicators for Weighted Fair Queues".

* cited by examiner

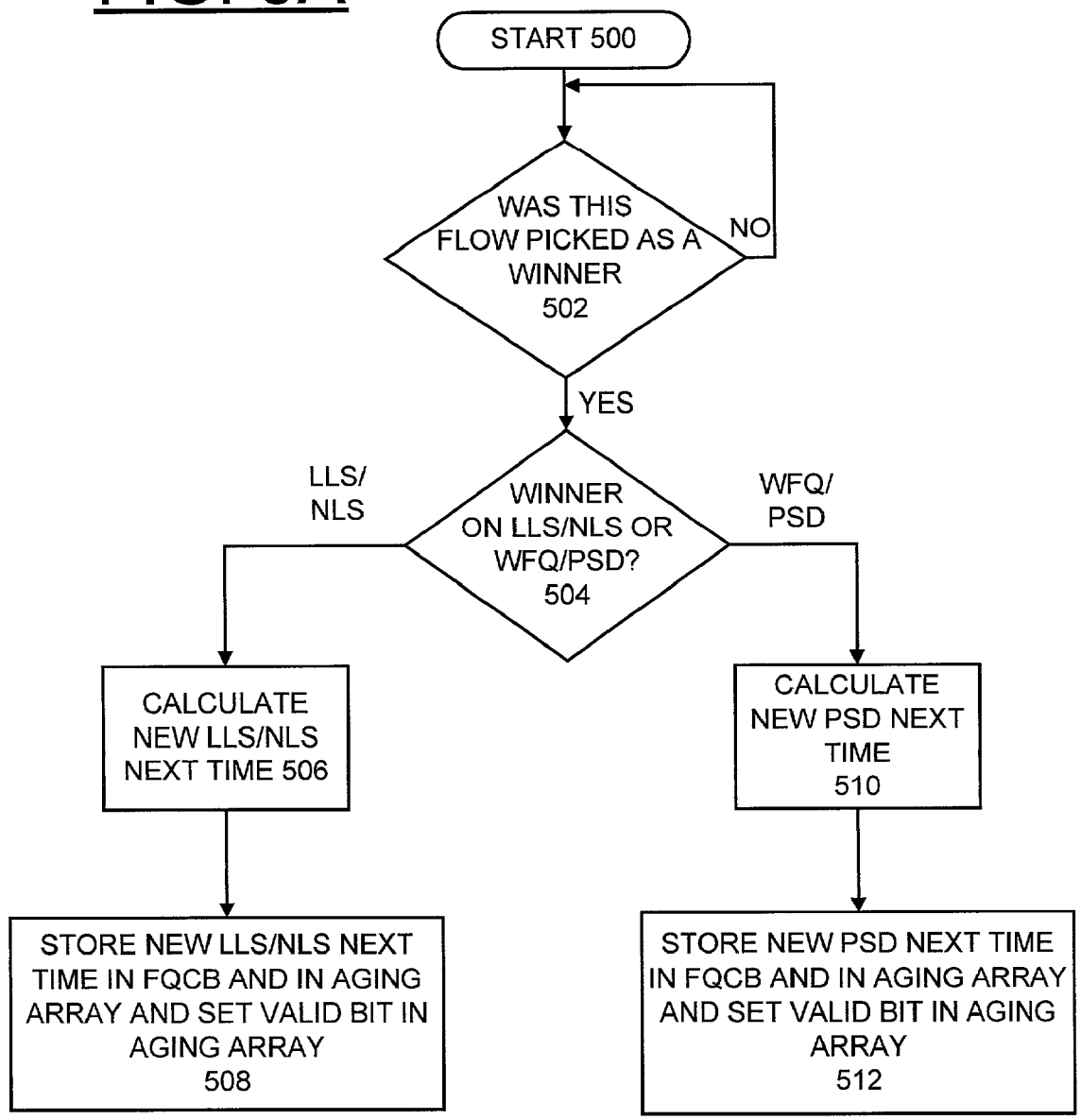

FIG. 5B

NEXT TIME 520 = (FRACTION 522)*(2**EXPONENT 524)

FRACTION 522 (15-BIT VALUE)
6-BIT EXTENSION 528   9-BIT BASE VALUE 526

EXPONENT 524 (3-BIT VALUE)

FIG. 5C

NEXT TIME ARRAY DATA 530

1 SELECTOR BIT 532
1 LLS/NLS NEXT TIME VALID BIT 534
1 PSD NEXT TIME VALID BIT 536
4 MSB OF NEXT TIME EXTENSION 528
3 NEXT TIME EXPONENT BITS 524

QOS SCHEDULER AND METHOD FOR IMPLEMENTING QUALITY OF SERVICE WITH AGING TIME STAMPS

RELATED APPLICATIONS

Related United States patent applications by William John Goetzinger, Glen Howard Handlogten, James Francis Mikos, and David Alan Norgaard and assigned to the present assignee are being filed on the same day as the present patent application including:

U.S. patent application Ser. No. 10/004,373, entitled "QoS SCHEDULER AND METHOD FOR IMPLEMENTING PEAK SERVICE DISTANCE USING NEXT PEAK SERVICE TIME VIOLATED INDICATION";

U.S. patent application Ser. No. 10/004,440, entitled "QoS SCHEDULER AND METHOD FOR IMPLEMENTING QUALITY OF SERVICE WITH CACHED STATUS ARRAY";

U.S. patent application Ser. No. 10/004,217, entitled "QoS SCHEDULER AND METHOD FOR IMPLEMENTING QUALITY OF SERVICE ANTICIPATING THE END OF A CHAIN OF FLOWS";

U.S. patent application Ser. No. 10/016,518, entitled "WEIGHTED FAIR QUEUE HAVING EXTENDED EFFECTIVE RANGE";

U.S. patent application Ser. No. 10/015,994, entitled "WEIGHTED FAIR QUEUE SERVING PLURAL OUTPUT PORTS";

U.S. patent application Ser. No. 10/015,760, entitled "WEIGHTED FAIR QUEUE HAVING ADJUSTABLE SCALING FACTOR"; and U.S. patent application Ser. No. 10/002,085, entitled "EMPTY INDICATORS FOR WEIGHTED FAIR QUEUES".

FIELD OF THE INVENTION

The present invention relates generally to the storage and data networking fields, and more particularly, relates to a scheduler, scheduling method, and computer program product for implementing Quality-of-Service (QoS) scheduling with aging time stamps.

DESCRIPTION OF THE RELATED ART

Storage and data networks are designed to support the integration of high quality voice, video, and high speed data traffic. Storage and data networking promises to provide transparent data sharing services at high speeds. It is easy to see that rapid movement and sharing of diagrams, pictures, movies, audio, and the like requires tremendous bandwidth. Network management is concerned with the efficient management of every bit of available bandwidth.

A need exists for a high speed scheduler for networking that ensures the available bandwidth will not be wasted and that the available bandwidth will be efficiently and fairly allocated. The scheduler should permit many network traffic flows to be individually scheduled per their respective negotiated Quality-of-Service (QoS) levels. This would give system administrators the ability to efficiently tailor their gateways, switches, storage area networks (SANs), and the like. Various QoS can be set up using combinations of precise guaranteed bandwidth, required by video for example, and limited or unlimited best effort bandwidth for still pictures, diagrams, and the like. Selecting a small amount of guaranteed bandwidth with the addition of some bandwidth from the pool of best effort bandwidth should guarantee that even during the highest peak periods, critical data will be delivered to its application at that guaranteed rate.

A scheduler advantageously may be added to a network processor to enhance the quality of service (QoS) provided by the network processor subsystem.

As the number of flows grows significantly in high-performance schedulers, faster methods of aging flows are required. Also, known conventional scheduler implementations do not age next-time schedule points of flows attached to a peak bandwidth service (PBS) calendar. This omission allows disparity in the scheduling of flows under certain conditions. Since a next-time schedule point specifies where an empty flow should be attached to a calendar when a new frame arrives, it is important to know if the next-time value is valid or not.

SUMMARY OF THE INVENTION

A principal object of the present invention is to provide a QoS scheduler, scheduling method, and computer program product for implementing Quality-of-Service (QoS) scheduling with aging time stamps. Other important objects of the present invention are to provide such scheduler, scheduling method, and computer program product for implementing QoS scheduling with aging time stamps substantially without negative effect and that avoids some disadvantages of prior art arrangements.

In brief, a scheduler, scheduling method, and computer program product are provided for implementing Quality-of-Service (QoS) scheduling of a plurality of flows with aging time stamps. Subsets of time stamp data stored in a time stamp aging memory array are sequentially accessed. Each time stamp data subset contains time stamp data for a subplurality of flows. Guaranteed aging processing steps are performed for each flow to identify and mark invalid calendar next time values. When a new frame arrival for an empty flow is identified, stored flow queue control block (FQCB) time stamp data and the time stamp data in the time stamp aging memory array are accessed. Based on the calendar to which the new frame is directed or the target calendar for the new frame, the target calendar next time valid bit of the time stamp aging memory array data is checked. When the target calendar next time valid bit is on, a target calendar next time value from the flow queue control block (FQCB) time stamp data is compared with a current time. When the target calendar next time is less than the current time, the target calendar next time valid bit is turned off to mark the target calendar next time as invalid.

In accordance with features of the invention, the guaranteed aging processing steps for each flow in the time stamp data subset includes checking a selection indicator of the time stamp aging memory array data for the flow to identify a calendar. Responsive to the selection indicator value, a calendar next time valid bit is checked. When the calendar next time valid bit is on, a calendar next time is compared with a current time. When the calendar next time is less than the current time, the calendar next time valid bit is turned off to mark the calendar next time as invalid. Invalid time stamp values are identified for all scheduler calendars.

BRIEF DESCRIPTION OF THE DRAWINGS

The present invention together with the above and other objects and advantages may best be understood from the following detailed description of the preferred embodiments of the invention illustrated in the drawings, wherein:

FIG. 5A is a flow chart illustrating exemplary sequential steps for storing time stamp data of the preferred embodiment;

FIGS. 5B and 5C respectively illustrate exemplary data structures for a calendar next time value and next time data for each flow maintained in an internal memory array in the QoS scheduler of FIG. 2.

DETAILED DESCRIPTION OF THE PREFERRED EMBODIMENTS

Figure 1A:
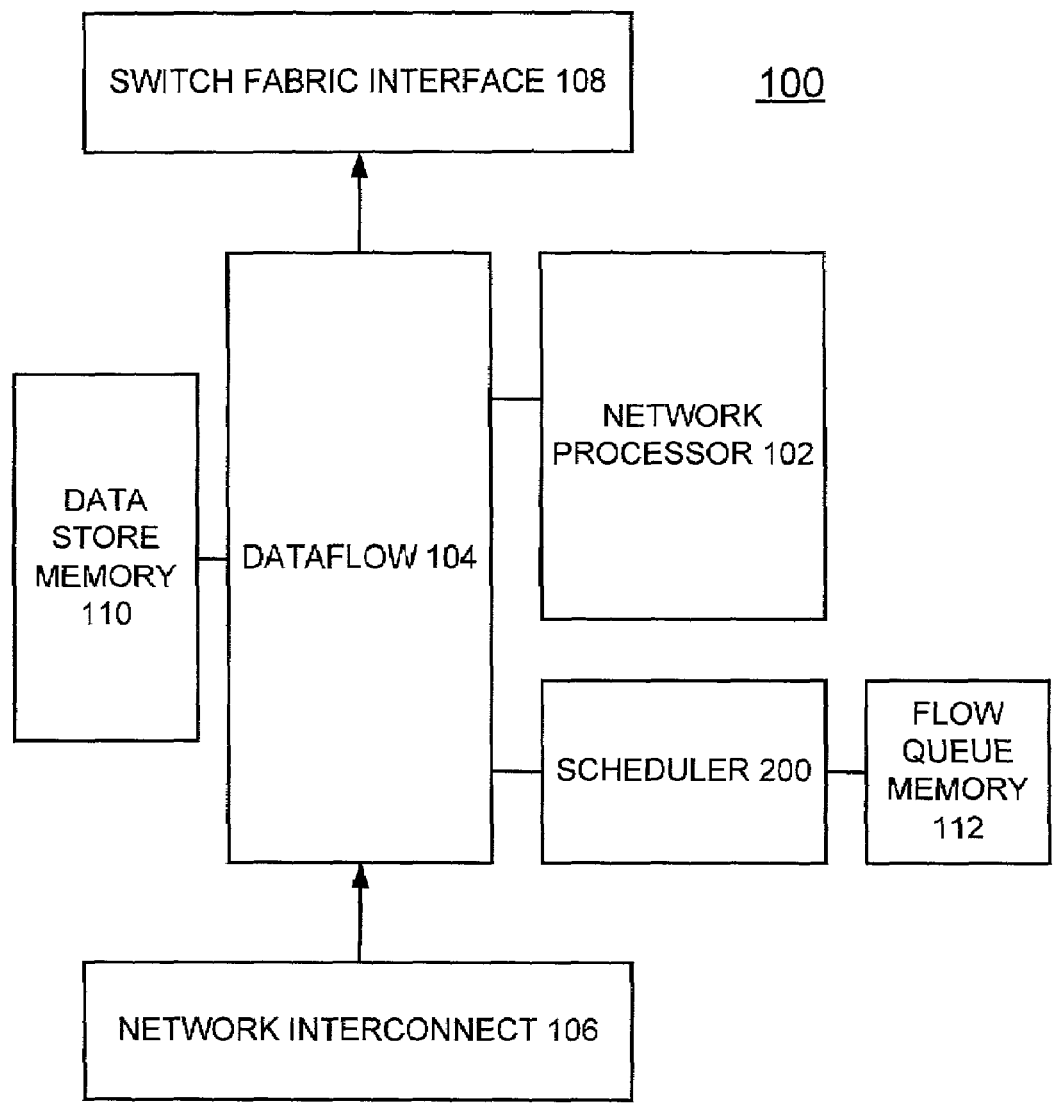
FIG. 1A is a block diagram illustrating a network processor system including a scheduler for carrying out scheduling methods for implementing Quality-of-Service (QoS) scheduling with aging time stamps of the preferred embodiment.

Having reference now to the drawings, in FIG. 1A, there is shown a network processor system generally designated by the reference character 100 including a scheduler 200 for carrying out scheduling methods for implementing Quality-of-Service (QoS) scheduling with aging time stamps of the preferred embodiment. As shown in FIG. 1A, network processor system 100 includes a network processor 102 that executes software responsible for forwarding network traffic. Network processor 102 includes hardware assist functions for performing operations, such as table searches, policing, and statistics tracking. A dataflow 104 serves as the primary data path for transmitting and receiving data flow traffic, for example, via a network interconnect 106 and/or a switch fabric interface 108. Dataflow 104 provides an interface to a large data store memory 110 for buffering of traffic bursts when an incoming frame rate exceeds an outgoing frame rate. An external flow queue memory 112 is coupled to scheduler 200. As network processor 102 performance continues to increase, unique techniques and design solutions enable the QoS scheduler 200 to perform reliably at these high data rates.

Scheduler 200 of the preferred embodiment permits many network traffic flows, for example, 64 thousand (64K) network traffic flows to be individually scheduled per their respective assigned Quality-of-Service (QoS) level. Each flow is basically a one-way connection between two different points. QoS parameters are held in a flow queue control block (FQCB), such as in the external flow queue memory 112. QoS parameters include sustained service distance (SSD), peak service distance (PSD), queue distance (QD), port identification (ID), and the like. There can be, for example, 64 thousand flows and a FQCB for each flow.

Figure 1B:
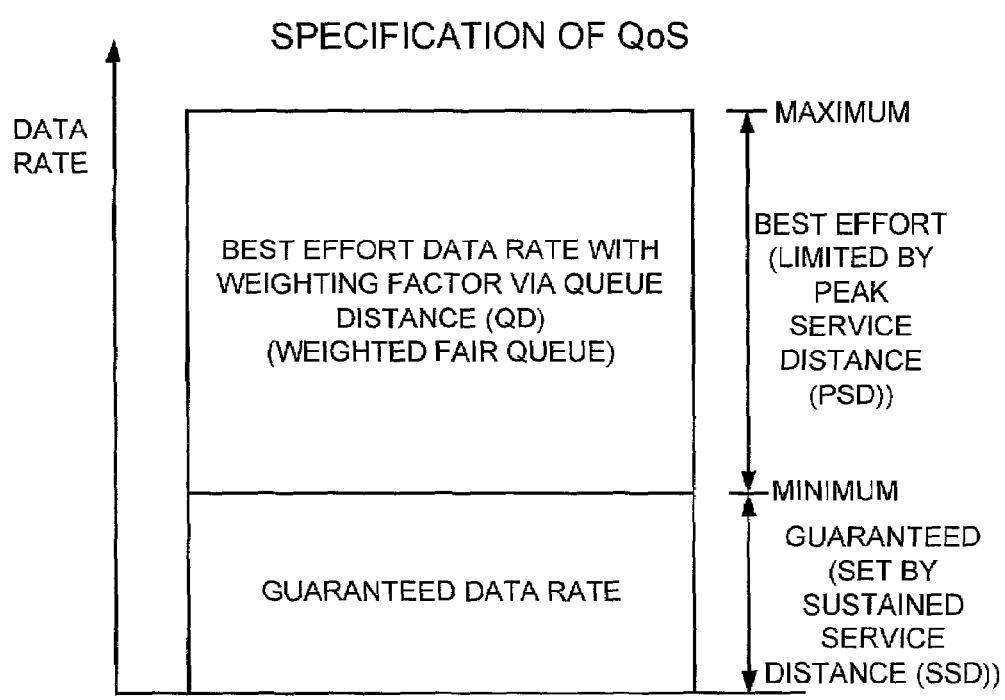
FIG. 1B is diagram providing a graphical illustration of various types of QoS algorithms in accordance with the preferred embodiment.

FIG. 1B provides a graphical illustration of various types of QoS algorithms. The scheduler 200 provides for quality of service by maintaining flow queues that may be scheduled using various algorithms, such as a set guaranteed bandwidth, or best effort or weighted fair queue (WFQ) with or without a peak bandwidth service (PBS) limit. The best effort or weighted fair queue is limited via the peak service distance (PSD) QoS parameter. The guaranteed bandwidth is set via the sustained service distance (SSD) QoS parameter. A combination of these algorithms provide efficient utilization of available bandwidth. The scheduler 200 supplements the congestion control algorithms of dataflow 104 by permitting frames to be discarded based on per flow queue thresholds.

Figure 2:
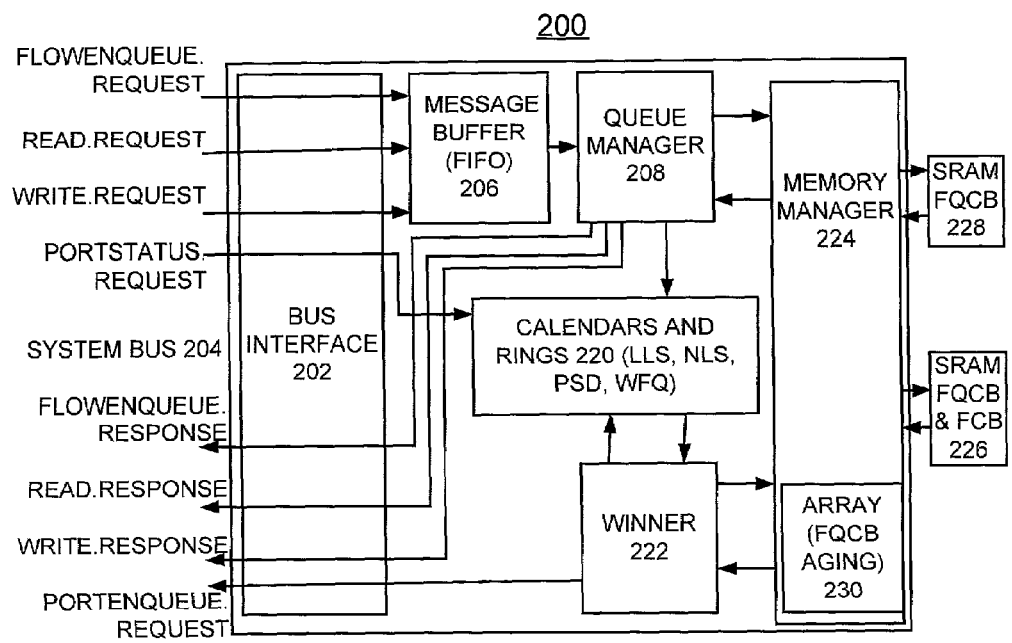
FIG. 2 is a high-level system diagram illustrating the scheduler of FIG. 1A for carrying out scheduling methods for implementing QoS scheduling with aging time stamps of the preferred embodiment.

Referring now to FIG. 2, there is shown a high-level system diagram illustrating the scheduler 200 for carrying out scheduling methods of the preferred embodiment. Scheduler 200 includes a bus interface 202 coupled to a system bus 204 interconnecting modules in the system 100. Chipset messages are exchanged between modules using system bus 204. Messages include flow enqueue requests which add frames to a given flow and read and write requests. Scheduler 200 includes a message buffer 206, such as a first-in first-out (FIFO) message buffer, that stores messages until they are ready to be executed. Scheduler 200 includes a queue manager 208 coupled to the message buffer 206. Queue manager 208 processes the incoming messages to determine what action is required. Queue manager 208 is coupled to calendars and rings block 220 and a memory manager 224. A winner partition 222 arbitrates between the calendars 220 to choose which flow will be serviced next. The memory manager 224 coordinates data reads from and writes to a first and optional second external static random access memory (SRAM) 226 and 228 and an internal memory array 230.

For a flow enqueue request received by queue manager 208, the flow's FQCB information is retrieved from external SRAM 226 and examined to determine if the new frame should be added to an existing frame string for a given flow, start a new frame string, or be discarded. In addition, the flow queue may be attached to a calendar or ring for servicing in the future. Read and write request messages received by queue manager 208 are used to initialize flows.

Port back-pressure from the dataflow 104 to the scheduler 200 occurs via the port status request message originated from the dataflow and applied to the calendars block 220. When a port threshold is exceeded, all WFQ and PBS traffic associated with that port is held in the scheduler 200 and the selection logic of winner partition 222 does not consider those flows potential winners. When port back-pressure is removed, the flows associated with that port are again eligible to be winners.

Calendars and rings block 220 includes, for example, three calendars (low latency service (LLS), normal latency service (NLS), peak bandwidth service (PBS)) and weighted fair queues (WFQs). The calendars are time based. The weighted fair queues (WFQS) are weight based. The WFQs are also referred to as best effort queues because WFQs can only schedule excess bandwidth and therefore can have no bandwidth guarantee associated with them.

Flows are attached to one or more of three calendars (LLS, NLS, PBS) and one WFQ ring 220 in a manner consistent with its QoS parameters. For example, if a flow has a guaranteed bandwidth component, it is attached to a time based calendar. If a flow has a WFQ component, it is attached to the WFQ ring. A flow may have both a guaranteed and best effort or WFQ component. The calendars 220 are used to provide guaranteed bandwidth with both a low latency service (LLS) and a normal latency service (NLS) packet rate. Flows are scheduled for service at a certain time in the future. WFQ rings are used by the weighted fair queuing algorithm. Entries are chosen based upon position in the WFQ rings 220 without regard to time. The WFQ rings 220 are work conserving or idle only when there are no flows to be serviced. A flow set up using a WFQ ring can optionally have a peak bandwidth limit associated with it.

Scheduler 200 performs high speed scheduling, for example, processing 27 Million frames per second (Mframes/second). Scheduling rates per flow for the LLS, NLS and PBS calendars 220 range, for example, from 10 Giga bits per second (Gbps) to 3.397 Thousand bits per second (Kbps). Rates do not apply to the WFQ ring.

SRAM 226 is an external high speed, for example, quad data rate (QDR) SRAM containing flow queue information or flow queue control block (FQCB) information and frame information or frame control block (FCB) information. SRAM 228 is, for example, an optional external QDR SRAM containing flow queue information or flow queue control block (FQCB) depending on the number of flows. Internal array 230 contains, for example, 64 thousand (64K) time stamp aging information for 64K network traffic flows. Internal array 230 may be used in place of the external SRAM 228 if less than four thousand (4K) flows are required and is also used to hold time stamp aging information.

Queue manager 208 performs the queuing operation of scheduler 200 generally as follows: A linked list or string of frames is associated with each flow. Frames are always enqueued to the tail of the linked list. Frames are always dequeued from the head of the linked list. Flows are attached to one or more of four calendars/rings (LLS, NLS, PBS, WFQ) 220 using the QoS parameters. Selection of which flow to service is done by examining the calendars/rings 220 in the order of LLS, NLS, PBS, WFQ. Then the frame at the head of the selected flow is selected for service. The flow queues are not grouped in any predetermined way to target port. The port number for each flow is user programmable. All WFQ flows with the same port ID are attached to the same WFQ ring. The QoS parameters also apply to the discard flow. The discard flow address is user selectable and is set up at configuration time.

When a flow enqueue request is sent to the scheduler 200, its frame is tested for possible discard using information from the flow enqueue request message and information stored in the FQCB. If the frame is to be discarded then the FQCB pointer is changed from the FQCB in flow enqueue request message to the discard FQCB. Alternatively, the frame is added to the tail end of the FCB chain associated with the FQCB. In addition, the flow is attached if it is not already attached to the appropriate calendar (LSS, NLS, PBS), or ring (WFQ). As time passes, selection logic of winner partition 222 determines which flow is to be serviced (first LLS, then NLS, then PBS, then WFQ). If a port bandwidth threshold has been exceeded, the WFQ and PBS component associated with that port are not eligible to be selected. When a flow is selected as the winner, the frame at the head of the FCB chain for the flow is dequeued and a port enqueue response message is issued to the dataflow 104. If the flow is eligible for a calendar reattach, the flow is reattached to the appropriate calendar/ring (LLS, NLS, PBS, or WFQ) in a manner consistent with the QoS parameters.

When a flow with only an LLS or an NLS component goes empty, (that is, a frame is dispatched from the flow and there are no more frames to dispatch,) then the flow is not rescheduled on any calendar and an LLS/NLS Next Time value is written to the FQCB for the flow. The LLS/NLS Next Time value indicates the earliest time in the future that the flow can be scheduled on an LLS/NLS calendar when the next frame for this flow arrives.

Similarly, when a frame is dispatched from a flow that has only a QD component with a PSD, a PSD Next Time value is calculated and written to the FQCB for the flow. This PSD Next Time indicates the earliest time in the future that the flow can be selected as a winner on the WFQ without violating the flow's PSD specification.

The process used to mark a Next Time invalid is called aging. Aging of Next Time values is needed because all real Current Time counters and Next Time fields are implemented using finite numbers of bits. This means that given a future Next Time for a flow, that Next Time will initially appear to be later than the current time. Eventually, as the Current Time counter advances, Next Time will first appear to be equal to Current Time and then will be passed by Current Time. This is the expected relationship sequence between Current Time and Next Time. However, because Current Time is implemented using a counter of the finite size, eventually the Current Time counter will reach its maximum value and then restart or roll over to its minimum value. When this occurs, Next Time will again appear to be later than current time, which is incorrect. Because a scheduler assigns flows to positions on calendars using the Current Time and Next Time relationship, this will result in incorrect scheduler behavior. Aging is used to mark Next Time invalid after it has been passed by Current Time, so that this incorrect behavior does not occur.

Conventional scheduler implementations handle aging using link lists. This method works well when only a small number of flows are being scheduled. However, as the number of flows significantly grows in high-performance schedulers, the link list method of aging is inadequate. Also, known scheduler implementations do not age Next Time values of all flows, such as flows attached to a peak service distance (PSD) calendar. This omission allows disparity in the scheduling of flows under certain conditions. For example, since a next-time schedule point specifies where an empty flow should be attached to a calendar when a new frame arrives, it is important to know if the next-time value is valid of not.

In accordance with features of the preferred embodiment, an aging method is provided that can be applied to a large number of scheduled flows. The method of the preferred embodiment also ages the Next Time values of all flows, regardless of whether the flows are scheduled on any calendar. In the preferred embodiment, Next Time information for each flow is stored in the respective FQCB in off-chip or external memory, SRAM 226. In addition, a subset of each flow's Next Time information is stored in the on-chip array 230 labeled FQCB AGING in scheduler 200 in FIG. 2.

In accordance with features of the preferred embodiment, combined coarse and fine aging methods prevent incorrect scheduling of flows because of invalid time stamp values on any scheduler calendar. A set of indicator bits and time stamp data are maintained that indicate the target calendar and next-time schedule point which are stored in external memory, SRAM 226. A subset of that time stamp data is stored internally in the scheduler 200 in the FQCB AGING memory array 230. A coarse aging algorithm for flows which have been inactive for a relatively long period of time uses data stored in internal array 230, and a fine aging algorithm for flows which have been inactive for short periods of time uses data stored in the external SRAM 226. The coarse and fine aging methods are used together to implement a complete aging solution for all scheduler calendars LLS/NLS, PSD.

Figure 3:
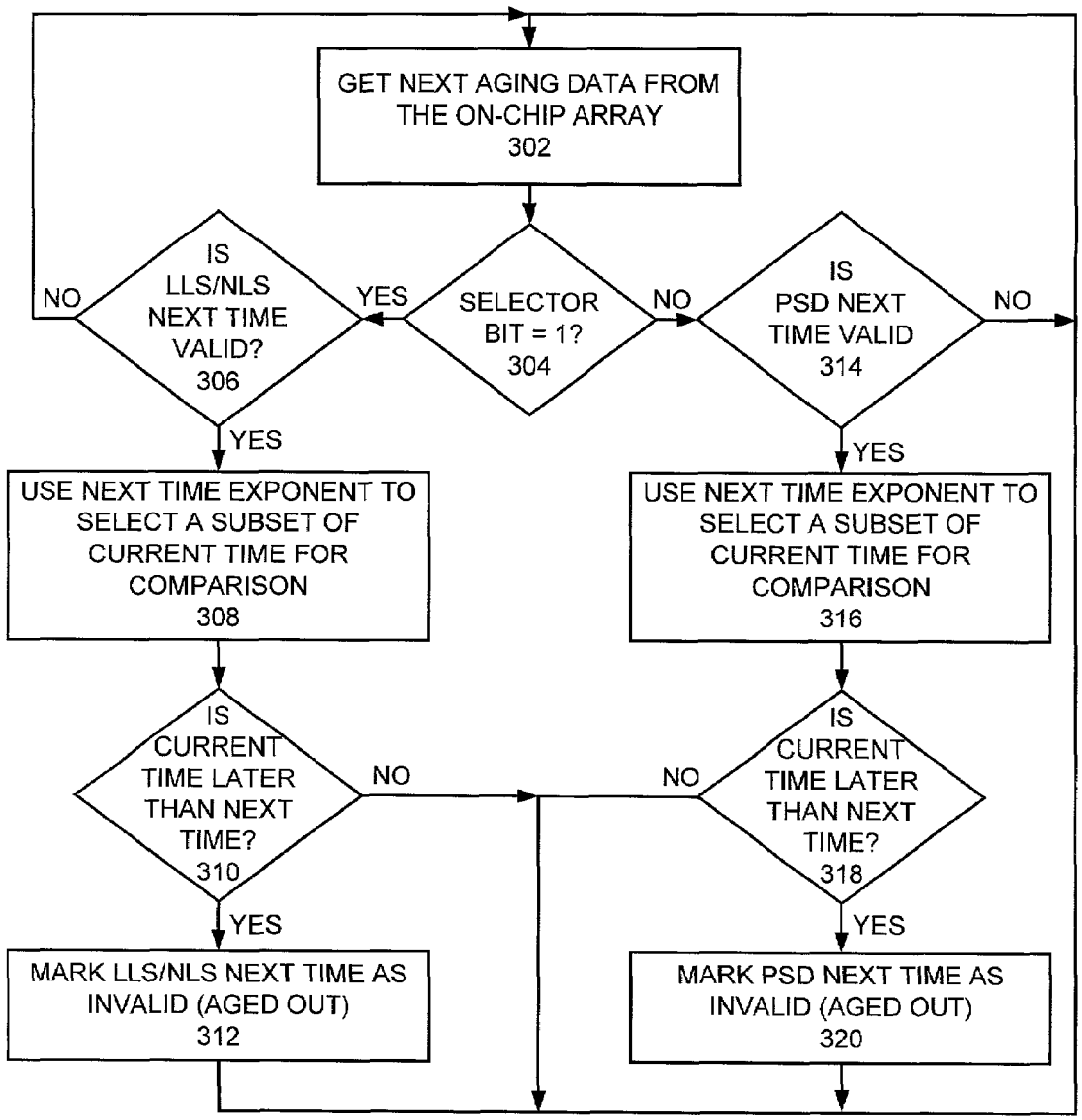
FIG. 3 is a flow chart illustrating exemplary sequential steps for carrying out course or guaranteed aging methods for implementing Quality-of-Service (QoS) scheduling with aging time stamps of the preferred embodiment.
Figure 4:
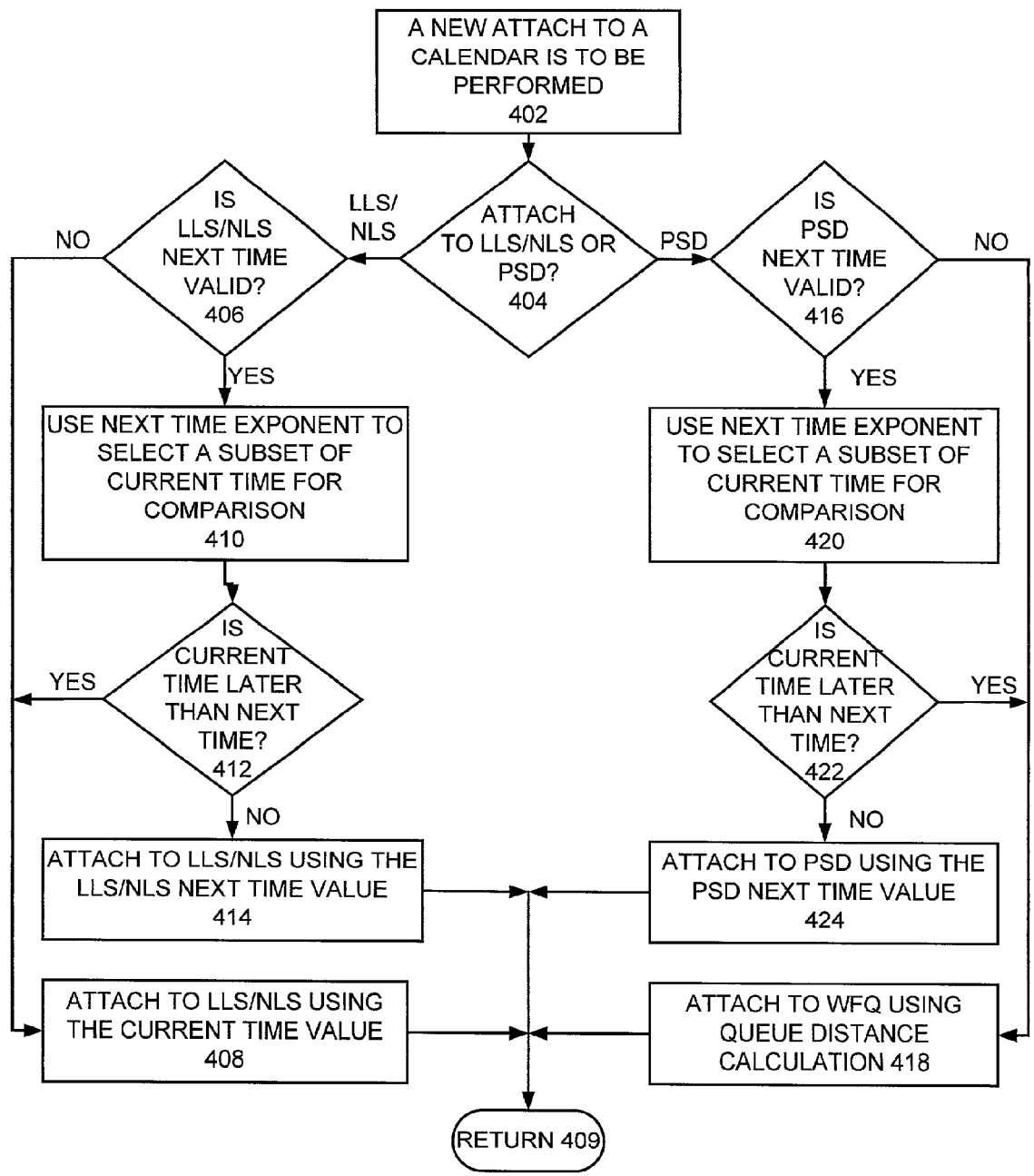
FIG. 4 is a flow chart illustrating exemplary sequential steps for carrying out fine or on-the-fly aging methods for implementing Quality-of-Service (QoS) scheduling with aging time stamps of the preferred embodiment.

The preferred embodiment implements a distributed aging methodology that is composed of coarse aging as illustrated and described with respect to FIG. 3 and fine aging as illustrated and described with respect to FIG. 4. Coarse aging handles flows that have been inactive for relatively long periods of time. Fine aging handles flows that have been inactive for relatively short periods.

Coarse aging is implemented using the on-chip aging array 230. It ensures all 64K possible flows have their Next Time values checked approximately every 300 microseconds. Hardware accesses the Next Time data, for example, for up to 8 flows every 6 cycles (36 ns). For each set of data, a coarse aging process is performed as illustrated and described with respect to FIG. 3.

Because coarse aging uses only a subset of the Next Time data, it does not invalidate Next Time values until the current time has passed the Next Time value by a relatively large amount. Fine aging handles those cases when a flow's Next Time value has been invalid for only a relatively short period of time.

Fine aging occurs whenever a frame arrives to be scheduled on a flow that is currently empty. At that time the appropriate Next Time, LLS/NLS Next Time or PSD Next Time, depending on the calendar on which the flow will be scheduled is compared in its entirety to the current time. If current time is later than Next Time, then the Next Time valid bit is turned off because the time indicated has passed. Otherwise, the valid bit is preserved, because the Next Time is still valid. The fine aging algorithm is illustrated and described with respect to FIG. 4.

The combined coarse and fine aging methods of the preferred embodiment, prevent incorrect scheduling of flows on any scheduler calendar because of invalid Next Time values.

Referring now to FIG. 3, exemplary sequential steps are shown for carrying out coarse or guaranteed aging of the preferred embodiment. First next aging data is obtained from the on-chip array 230 as indicated in a block 302. The selector bit is used to determine if aging is to be performed on an LLS/NLS calendar or on a PSD calendar. As indicated in a decision block 304, it is determined whether the selector bit is set. Using the selector value, the appropriate valid bit (LLS/NLS or PSD) is interrogated. If the selector bit is on or set, it is determined whether the LLS/NLS Next Time is valid as indicated in a decision block 306. If that LLS/NLS valid bit is off, no action is required because the flow's LLS/NLS Next Time is already invalid and the sequential steps return to block 302. Otherwise if LLS/NLS Next Time is valid, processing continues as indicated in a block 308 where the Next Time exponent is used to select a subset of current time for comparison. The time represented by the upper 4 bits of LLS/NLS Next Time are compared to a subset of the current time, based on the LLS/NLS Next Time exponent as indicated in a decision block 310. If this comparison shows LLS/NLS Next Time is later than or equal to the current time subset, then no action is taken and the sequential steps return to block 302. In this case, LLS/NLS Next Time is still valid. Otherwise, if this comparison shows Next Time is less than the current time subset, then the LLS/NLS valid bit for Next Time is turned off to indicate that LLS/NLS Next Time has aged out as indicated in a block 312. Then the sequential steps return to block 302.

If the selector bit is off or not set, it is determined whether the PSD Next Time is valid as indicated in a decision block 314. If that valid bit is off, no action is required because the flow's Next Time is already invalid and the sequential steps return to block 302. Otherwise, if the PSD Next Time is valid processing continues as indicated in a block 316 where the Next Time exponent is used to select a subset of current time for comparison. The time represented by the upper 4 bits of PSD Next Time are compared to a subset of the current time, based on the PSD Next Time exponent as indicated in a decision block 318. If this comparison shows PSD Next Time is later than or equal to the current time subset, then no action is taken and the sequential steps return to block 302. In this case, PSD Next Time is still valid. Otherwise, if this comparison shows PSD Next Time is less than the current time subset, then the valid bit for PSD Next Time is turned off to indicate that PSD Next Time has been aged out as indicated in a block 320. Then the sequential steps return to block 302.

Referring now to FIG. 4, there are shown exemplary sequential steps for carrying out fine or on-the-fly aging of the preferred embodiment starting when a new attach to a calendar is to be performed as indicated in a block 402. Whenever a frame arrives to be scheduled on a flow that is currently empty, at that time the appropriate LLS/NLS or PSD calendar for attach is identified as indicated in a decision block 404. Data is obtained for the flow from the external SRAM 226. When the LLS/NLS calendar is identified for the attach, it is determined whether the LLS/NLS Next Time is valid as indicated in a decision block 406. If the LLS/NLS valid bit is off because the flow's LLS/NLS Next Time is invalid, the flow is attached to the LLS/NLS calendar using the current time value as indicated in a block 408 and the sequential steps are completed as indicated in a block 409. Otherwise if LLS/NLS Next Time is valid, processing continues as indicated in a block 410 where the LLS/NLS Next Time exponent is used to select a subset of current time for comparison. The time represented by the entire LLS/NLS Next Time fraction is compared to a subset of the current time, based on the LLS/NLS Next Time exponent as indicated in a decision block 412. If this comparison shows LLS/NLS Next Time is later than or equal to the current time subset where the current time is earlier than the LLS/NLS Next Time, the LLS/NLS Next Time valid bit is preserved and the flow is attached to the LLS/NLS calendar using the LLS/NLS Next Time value as indicated in a block 414. If this comparison shows LLS/NLS Next Time is less than the current time subset where the current time is later than the LLS/NLS Next Time, the LLS/NLS Next Time valid bit is turned off and the flow is attached to the LLS/NLS calendar using the current time value at block 408.

When the PSD calendar is identified for the attach at decision block 404, it is determined whether the PSD Next Time is valid as indicated in a decision block 416. If the flow's PSD Next Time is invalid where the valid bit is off, the flow is attached to the WFQ ring using a queue distance calculation as indicated in a block 418. Otherwise if PSD Next Time is valid, processing continues as indicated in a block 420 where the PSD Next Time exponent is used to select a subset of current time for comparison. The time represented by the entire PSD Next Time fraction is compared to a subset of the current time, based on the PSD Next Time exponent as indicated in a decision block 422. If this comparison shows PSD Next Time is later than or equal to the current time subset where the current time is earlier than the PSD Next Time, the PSD Next Time valid bit is preserved and the flow is attached to the PSD calendar using the PSD Next Time value as indicated in a block 424. If this comparison shows PSD Next Time is less than the current time subset where the current time is later than the PSD Next Time, the PSD Next Time valid bit is turned off and the flow is attached to the WFQ ring using a queue distance calculation at block 418.

Referring to FIG. 5A, exemplary sequential steps are shown for storing time stamp data of the preferred embodiment starting at block 500. A flow is picked as a winner as indicated in a decision block 502, and one of its frames will be dispatched. It is determined whether the flow was a winner on the LLS/NLS calendar or the WFQ ring/PSD calendar as indicated in a decision block 504. If the flow was a winner on the LLS/NLS calendar, then a new LLS/NLS Next Time is calculated as indicated in a block 506. After the new LLS/NLS Next Time value is calculated, the new LLS/NLS Next Time value is stored in the appropriate field in the FQCB in SRAM 226 and in the aging memory array 230 and the appropriate LLS/NLS Next Time valid bit in the on-chip array 230 is set or turned on as indicated in a block 508. If the flow was a winner on the weighted fair queue (WFQ) ring or the PSD calendar, then a new PSD Next Time is calculated as indicated in a block 510. Then the new PSD Next Time value is stored in the appropriate field in the FQCB in SRAM 226 and in the aging memory array 230 and the appropriate PSD Next Time valid bit in the on-chip array 230 is set or turned on as indicated in a block 508.

A respective FQCB in SRAM 226 for the flow contains one LLS/NLS Next Time for the low latency service (LLS) and normal latency service (NLS) calendars and one PSD Next Time for the peak service distance (PSD) calendar. Both the LLS/NLS Next Time and PSD Next Time have the same structure.

Referring to FIG. 5B, an exemplary data structure is shown for a calendar next time value 520 represented by:

Next Time 520=(fraction 522)*(2exponent 524**).

Both the LLS/NLS Next Time and PSD Next Time have a 3-bit value for exponent 524 and a 15-bit value for fraction 522. The fraction 522 has two components, a 9-bit base value 526 and a 6-bit extension 528 appended to the left of the 9-bit base value 526.

Referring to FIG. 5B, an exemplary data structure for Next Time array data 530. The on-chip aging array 230 has, for example, 4K locations of 160 bits each. For each flow, 10 bits of Next Time information are maintained for Next Time array data 530 as follows: 1 selector bit 532; 1 LLS/NLS Next Time valid bit 534; 1 PSD Next Time valid bit 536; 4 most-significant bits (MSB) of the Next Time extension 528 (aging value); and the 3 Next Time exponent bits 524 (aging value exponent).

If the flow does not go empty, then the Next Time array data 530 in the on-chip array 230 is updated, for example, as follows: Selector=0; PSD Next Time Valid=1; aging value=upper 4 bits of PSD Next Time; aging value exponent=PSD Next Time exponent.

If the flow does go empty, then the Next Time array data 530 in the on-chip array is updated, for example, as follows: Selector=1, LLS/NLS Next Time Valid=1; aging value=upper 4 bits of LLS/NLS Next Time; aging value exponent=LLS/NLS Next Time exponent.

The Selector bit is used to determine which Next Time is selected for coarse aging. For example, when a flow is empty the LLS/NLS Next Time is selected for coarse aging, otherwise the PSD Next Time is selected for coarse aging. Fine aging is always performed on the Next Time associated with the calendar to which a new frame is directed. Since the Next Time value is used to specify where a flow should be attached to a calendar under certain conditions, it is important to know if the Next Time value is valid or not. If Next Time is not valid, then a different algorithm for attaching to the calendar is used. Coarse and fine aging of the preferred embodiment as shown in FIGS. 3 and 4 ensure that the scheduler 200 always knows when a Next Time value is valid.

Figure 6:
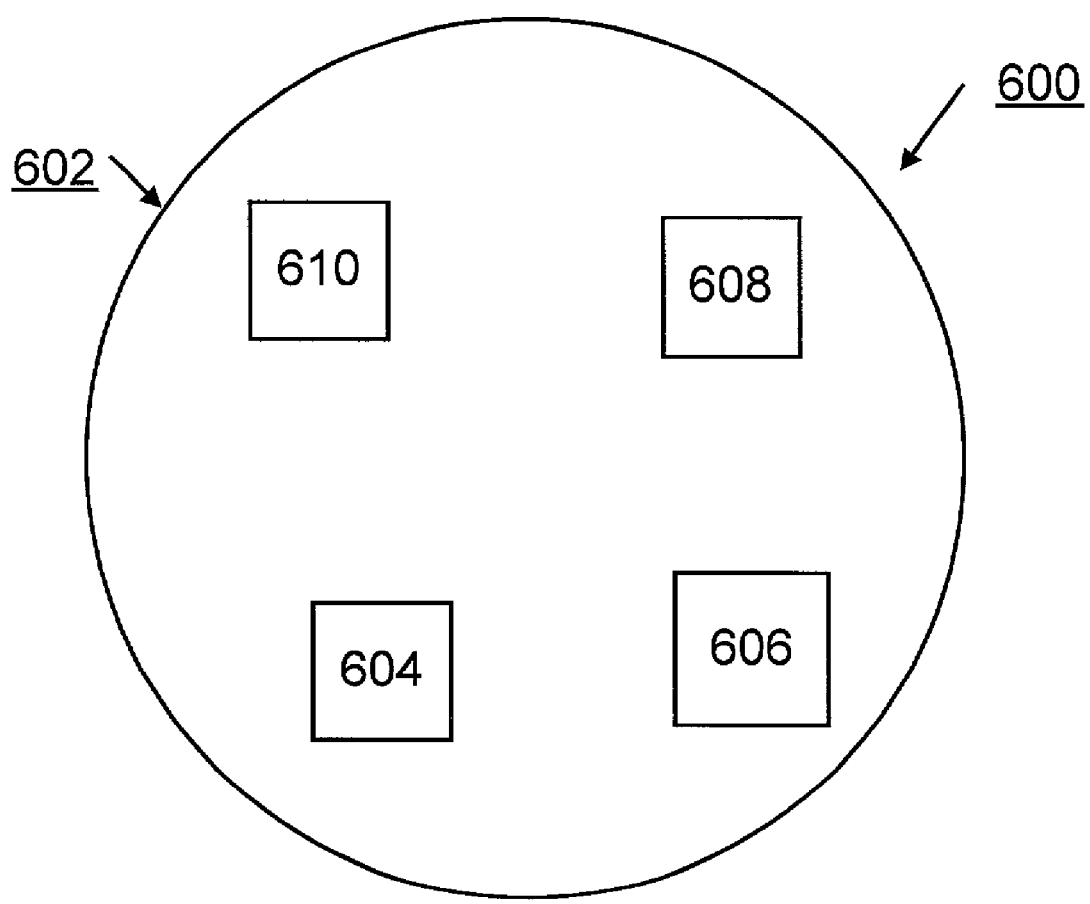
FIG. 6 is a block diagram illustrating a computer program product in accordance with the preferred embodiment.

Referring now to FIG. 6, an article of manufacture or a computer program product 600 of the invention is illustrated. The computer program product 600 includes a recording medium 602, such as, a floppy disk, a high capacity read only memory in the form of an optically read compact disk or CD-ROM, a tape, a transmission type media such as a digital or analog communications link, or a similar computer program product. Recording medium 602 stores program means 604, 606, 608, 610 on the medium 602 for carrying out the methods for coarse and fine algorithms that are used together to implement a complete aging solution for all scheduler calendars of the preferred embodiment in the system 100 of FIG. 1.

A sequence of program instructions or a logical assembly of one or more interrelated modules defined by the recorded program means 604, 606, 608, 610, direct the scheduler 200 for implementing QoS with aging time stamps of the preferred embodiment.

While the present invention has been described with reference to the details of the embodiments of the invention shown in the drawing, these details are not intended to limit the scope of the invention as claimed in the appended claims.

What is claimed is:

1. A scheduling method for implementing Quality-of-Service (QoS) scheduling of a plurality of flows with aging time stamps comprising the steps of:

sequentially accessing a subset of time stamp data from a time stamp aging memory array; each time stamp data subset containing time stamp data for a subplurality of flows;

performing guaranteed aging processing steps for each flow utilizing said time stamp data subsets to identify and mark invalid calendar next time values, identifying a new frame arrival for an empty flow and accessing time stamp data from a flow queue control block (FQCB) for said flow and said flow time stamp data in said time stamp aging memory array;

responsive to said identified new frame arrival for said empty flow, checking a selection indicator of said time stamp aging memory array data to identify said target calendar for attaching said flow; each flow being attached to at least one of a plurality of calendars including a low latency service (LLS)/normal latency service (NLS), a peak bandwidth service (PBS) and a weighted fair queue (WFQ) ring; said LLS, NLS, and PBS calendars being time based; said weighted fair queue (WFQ) ring being weight based;

responsive to said selection indicator value, checking a target calendar next time valid bit of said time stamp aging memory array data for said flow;

responsive to said target calendar next time valid bit being on, comparing a target calendar next time from said flow queue control block (FQCB) for said flow with a current time;

responsive to said target calendar next time being less than said current time, turning off said target calendar next time valid bit to mark said target calendar next time as invalid.

2. A scheduling method for implementing Quality-of-Service (QoS) scheduling of a plurality of flows with aging time stamps as recited in claim 1 includes the steps of storing time stamp data for each flow in said flow queue control block (FQCB) and in said time stamp aging memory array; said flow queue control block (FQCB) for each flow stored in external static random access memory (SRAM) and said time stamp aging memory array stored in an internal scheduler memory array.

3. A scheduling method for implementing Quality-of-Service (QoS) scheduling of a plurality of flows with aging time stamps as recited in claim 2 wherein the steps of storing time stamp data includes the steps of:
identifying a flow for servicing on a calendar and dispatching a frame from said identified flow;
calculating a calendar next time value for said identified flow; and
storing said calendar next time value for said identified flow in said flow queue control block (FQCB) for said identified flow; and
storing time stamp data in said time stamp aging memory array; said stored time stamp data in said time stamp aging memory array including at least a portion of said calendar next time value; said selection indicator and said calendar valid bit set to mark said calendar next time as valid.

4. A scheduling method for implementing Quality-of-Service (QoS) scheduling of a plurality of flows with aging time stamps as recited in claim 1 wherein said guaranteed aging processing steps for each flow in said time stamp data subset include the steps of:
checking said selection indicator, said selection indicator indicating a calendar;
responsive to said selection indicator, checking said calendar next time valid bit;
responsive to said calendar next time valid bit being on, comparing a calendar next time with a current time; and
responsive to said calendar next time being less than said current time, turning off said calendar next time valid bit to mark said calendar next time as invalid.

5. A scheduling method for implementing Quality-of-Service (QoS) scheduling of a plurality of flows with aging time stamps as recited in claim 1 wherein said target calendar is said peak bandwidth service (PBS) calendar and further include the step responsive to said PBS valid bit being off, of attaching said flow to sadi weighted fair queue (WFQ) ring using a queue distance calculation.

6. A scheduling method for implementing Quality-of-Service (QoS) scheduling of a plurality of flows with aging time stamps as recited in claim 1 wherein said target calendar is said peak bandwidth service (PBS) calendar and further include the step responsive to said PBS valid bit being on, of attaching said flow to said PBS calendar using a PBS next time value.

7. A scheduling method for implementing Quality-of-Service (QoS) scheduling of a plurality of flows with aging time stamps as recited in claim 1 wherein said target calendar is said low latency service (LLS)/normal latency service (NLS) calendar and further include the step responsive to said LLS/NLS valid bit being off, of attaching said flow to said LLS/NLS calendar using said current time value.

8. A scheduling method for implementing Quality-of-Service (QoS) scheduling of a plurality of flows with aging time stamps as recited in claim 1 wherein said target calendar is said low latency service (LLS)/normal latency service (NLS) calendar and further include the step responsive to said LLS/NLS valid bit being on, of attaching said flow to said LLS/NLS calendar using a LLS/NLS next time value.

9. A scheduler for implementing Quality-of-Service (QoS) scheduling of a plurality of flows with aging time stamps comprising:
a queue manager;
a plurality of calendars coupled to said queue manager for scheduling flows;
a memory coupled to said queue manager for storing a flow queue control block (FQCB) for each of said plurality of flows;
a time stamp aging memory array coupled to said queue manager for storing a set of indicator bits and time stamp data for each of said plurality of flows; said set of indicator bits including a calendar selector and at least one calendar next time valid bit;
a memory manager for sequentially accessing a subset of time stamp data from an time stamp aging memory array; each time stamp data subset containing time stamp data for a subplurality of flows; said memory manager for performing guaranteed aging processing steps for each flow in each time stamp data subset to identify and mark invalid calendar next time values,
said queue manager for identifying a new frame arrival for an empty flow;
said memory manager responsive to said new frame arrival for said empty flow for accessing time stamp data from a flow queue control block (FQCB) for said flow and said time stamp data in said time stamp aging memory array;
said memory manager responsive to said identified new frame arrival for said empty flow, for identifying a target calendar for attaching said flow; each flow being attached to at least one of a plurality of calendars including a low latency service (LLS)/normal latency service (NLS), a peak bandwidth service (PBS) and a weighted fair queue (WFQ) ring; said LLS, NLS, and PBS calendars being time based; said weighted fair queue (WFQ) ring being weight based;
said memory manager responsive to said identified target calendar, for checking said target calendar next time valid bit of said time stamp aging memory array data for said flow;
said memory manager responsive to said target calendar next time valid bit being on, for comparing a target calendar next time value from said flow queue control block (FQCB) for said flow with a current time;
said memory manager responsive to said target calendar next time being less than said current time, for turning oft said target calendar next time valid bit to mark said target calendar next time as invalid.

10. A scheduler for implementing Quality-of-Service (QoS) scheduling of a plurality of flows with aging time stamps as recited in claim 9 wherein said memory coupled to said queue manager for storing a flow queue control block (FQCB) for each of said plurality of flows includes an external static random access memory (SRAM).

11. A scheduler for implementing Quality-of-Service (QoS) scheduling of a plurality of flows with aging time stamps as recited in claim 9 wherein said time stamp aging memory array includes an internal memory array.

12. A scheduler for implementing Quality-of-Service (QoS) scheduling of a plurality of flows with aging time stamps as recited in claim 9 wherein said plurality of calendars coupled to said queue manager for scheduling flows includes said low latency service (LLS)/normal latency service (NLS) calendar; said peak bandwidth service (PBS) calendar; and said weighted fair queue (WFQ) ring.

13. A scheduler for implementing Quality-of-Service (QoS) scheduling of a plurality of flows with aging time stamps as recited in claim 12 wherein said set of indicator bits includes said calendar selector for selecting said PBS calendar or said LLS/NLS calendar.

14. A scheduler for implementing Quality-of-Service (QoS) scheduling of a plurality of flows with aging time stamps as recited in claim 13 wherein said at least one calendar next time valid bit includes a PBS next time valid bit and a LLS/NLS next time valid bit.

15. A scheduler for implementing Quality-of-Service (QoS) scheduling of a plurality of flows with aging time stamps as recited in claim 14 wherein said queue manager responsive to said PBS calendar identified as said target calendar and said PBS next time valid bit being off, for attaching said flow to said weighted fair queue (WFQ) ring using a queue distance calculation.

16. A scheduler for implementing Quality-of-Service (QoS) scheduling of a plurality of flows with aging time stamps as recited in claim 14 wherein said queue manager responsive to said PBS calendar identified as said target calendar and said PBS next time valid bit being on, for attaching said flow to said PBS calendar using said PBS next time value.

17. A scheduler for implementing Quality-of-Service (QoS) scheduling of a plurality of flows with aging time stamps as recited in claim 14 includes wherein said queue manager responsive to said LLS/NLS calendar selected as said target calendar and said LLS/NLS next time valid bit being off, for attaching said flow to said LLS/NLS calendar using said current time value.

18. A scheduler for implementing Quality-of-Service (QoS) scheduling of a plurality of flows with aging time stamps as recited in claim 14 includes wherein said queue manager responsive to said LLS/NLS calendar selected as said target calendar and said LLS/NLS next time valid bit being on, for attaching said flow to said LLS/NLS calendar using LLS/NLS next time value.

19. A computer program product for implementing Quality-of-Service (QoS) scheduling of a plurality of flows with aging time stamps in a scheduler, said computer program product including a plurality of computer executable instructions stored on a computer readable medium, wherein said instructions, when executed by said scheduler, cause said scheduler to perform the steps of:

sequentially accessing a subset of time stamp data from an time stamp aging memory array; each time stamp data subset containing time stamp data for a subplurality of flows;

performing guaranteed aging processing steps for each flow on a scheduler calendar in each time stamp data subset to identify and mark invalid calendar next time values, identifying a new frame arrival for an empty flow and accessing time stamp data from a flow queue control block (FQCB) for said flow and said time stamp data in said time stamp aging memory array;

responsive to said identified new frame arrival for said empty flow, checking a selection indicator of said time stamp aging memory array data to identify said target calendar for attaching said flow; each flow being attached to at least one of a plurality of calendars including a low latency service (LLS)/normal latency service (NLS), a peak bandwidth service (PBS) and a weighted fair queue (WFQ) ring; said LLS, NLS, and PBS calendars being time based; said weighted fair queue (WFQ) ring being weight based;

responsive to said selection indicator value, checking a target calendar next time valid bit of said time stamp aging memory array data for said flow;

responsive to said target calendar next time valid bit being on, comparing a target calendar next times from said flow queue control block (FQCB) for said flow with a current time; and responsive to said target calendar next time being less than said current time, turning off said target calendar next time valid bit to mark said target calendar next time as invalid.

20. A computer program product for implementing Quality-of-Service (QoS) scheduling of a plurality of flows with aging time stamps in a scheduler as recited in claim 18 wherein said instructions, when executed by said scheduler, cause said scheduler to perform the steps of storing said flow queue control block (FQCB) for each of said plurality of flows in an external memory and storing a set of indicator bits and time stamp data for each of said plurality of flows in a time stamp aging memory array, said set of indicator bits including said selector indicator and said calendar next time valid bit.

* * * * *